(12) United States Patent
Wu

(10) Patent No.: US 11,368,268 B2
(45) Date of Patent: Jun. 21, 2022

(54) DEMODULATION REFERENCE SIGNAL CONFIGURATION AND ADAPTATION

(71) Applicant: Kingstar Technologies, Inc., San Diego, CA (US)

(72) Inventor: Huaming Wu, San Diego, CA (US)

(73) Assignee: KINGSTAR TECHNOLOGIES, INC., San Diego, CA (US)

( * ) Notice: Subject to any disclaimer, the term of this patent is extended or adjusted under 35 U.S.C. 154(b) by 85 days.

(21) Appl. No.: 16/828,094

(22) Filed: Mar. 24, 2020

(65) Prior Publication Data

US 2020/0313818 A1    Oct. 1, 2020

Related U.S. Application Data

(60) Provisional application No. 62/827,629, filed on Apr. 1, 2019.

(51) Int. Cl.
*H04L 5/00* (2006.01)
*H04W 72/04* (2009.01)
*H04W 24/08* (2009.01)

(52) U.S. Cl.
CPC ........... *H04L 5/0048* (2013.01); *H04W 24/08* (2013.01); *H04W 72/042* (2013.01)

(58) Field of Classification Search
CPC ... H04L 5/0048; H04L 5/0064; H04L 5/0026; H04L 5/001; H04L 5/0094; H04L 27/261; H04L 27/2646; H04L 5/0051; H04W 72/042; H04W 24/08; H04W 24/10
See application file for complete search history.

(56) References Cited

U.S. PATENT DOCUMENTS

2018/0048446 A1* 2/2018 Jiang ................. H04L 5/0051

FOREIGN PATENT DOCUMENTS

WO   2017/184058 A1   10/2017
WO   2019/015587      1/2019

OTHER PUBLICATIONS

International Search Report and Written Opinion for International Application Serial No. PCT/US2020/024427 dated Jun. 24, 2020, 98 pages.
Huawei et al., "Sidelink data channel design of NR V2X", 3GPP Draft; R1-1808938, 3rd Generation Partnership Project (3GPP), XP051516313, Retrieved from the Internet: https://www.3gpp.org/DynaReport/TDocExMtg-R1-94-18796.htm, Aug. 20-24, 2018, pp. 1-5.
International Preliminary Report on Patentability for International Application Serial No. PCT/US2020/024427 dated Oct. 14, 2021, 8 pages.

* cited by examiner

*Primary Examiner* — Dady Chery
(74) *Attorney, Agent, or Firm* — Amin, Turocy & Watson, LLP

(57) ABSTRACT

Various embodiments disclosed herein provide for facilitating demodulation reference signal configuration and adaptation. According an embodiment, a system can comprise generating a demodulation reference signal configuration that defines location of a demodulation reference signal in frequency domain and time domain, selecting a time domain pattern and a frequency domain pattern based on the demodulation reference signal configuration and allocating resources for the demodulation reference signal on at least one physical shared channel based on the time domain pattern and frequency domain pattern.

20 Claims, 12 Drawing Sheets

DEMODULATION REFERENCE SIGNAL CONFIGURATION AND ADAPTATION

RELATED APPLICATION

The subject patent application claims priority to U.S. Provisional Patent Application No. 62/827,629, filed Apr. 1, 2019, and entitled "DEMODULATION REFERENCE SIGNAL CONFIGURATION AND ADAPTATION," the entirety of which application is hereby incorporated by reference herein.

TECHNICAL FIELD

This disclosure relates generally to a wireless communication system in general, and to a fifth generation (5G) wireless communication systems power control; and more specifically to facilitating demodulation reference signal configuration and adaptation.

BACKGROUND

Fifth generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This will enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relates to facilitating demodulation reference signal configuration and adaptation is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
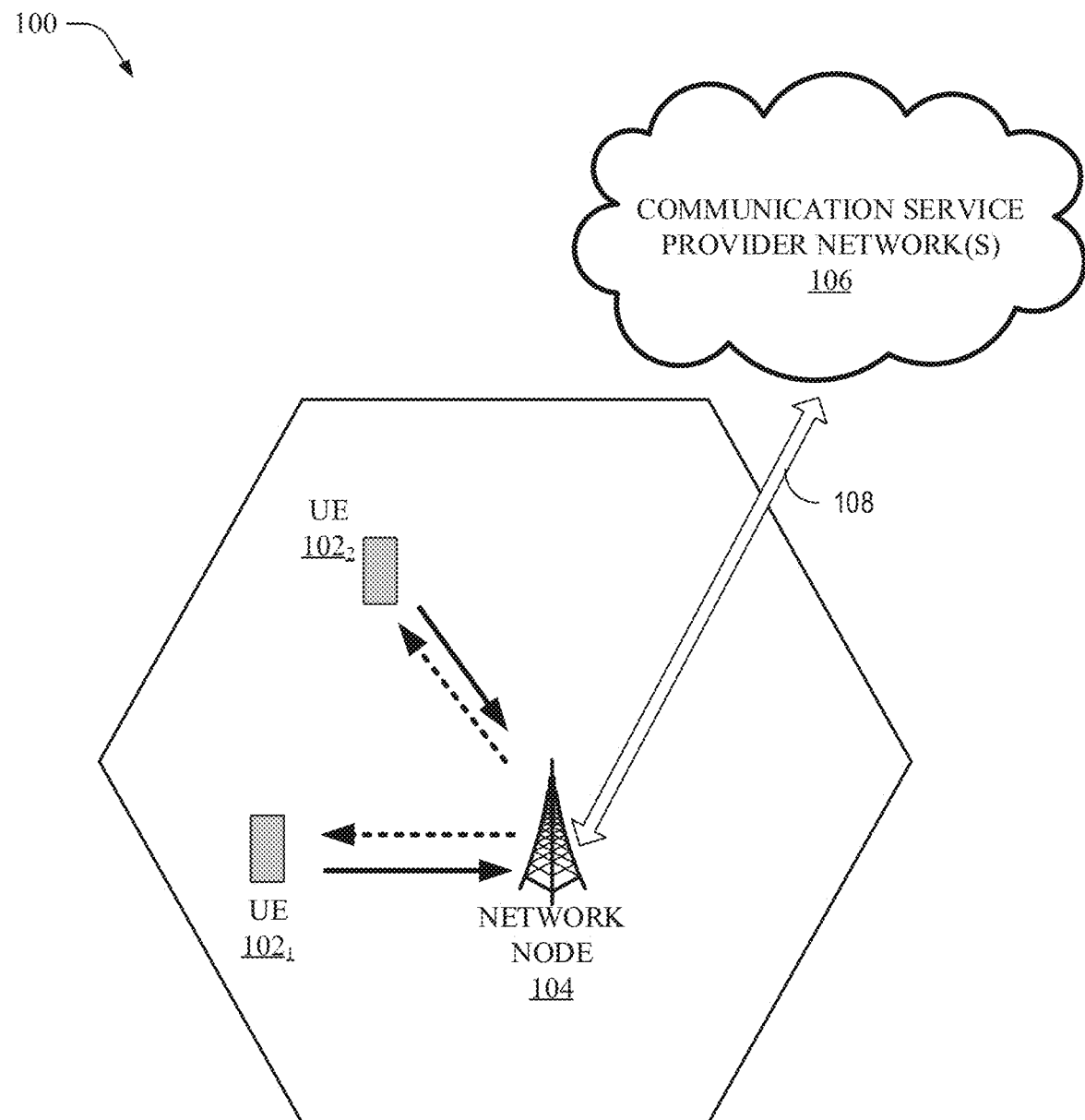
FIG. 1 illustrates a non-limiting example of a wireless communication system in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate demodulation reference signal configuration and adaptation in a new radio access environment. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate demodulation reference signal configuration and adaptation. Facilitating demodulation reference signal configuration and adaptation can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system.

Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise TOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, Femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In some embodiments, a Vehicle-to-everything (V2X) communication is the passing of information from a vehicle to any entity that may affect the vehicle, and vice versa. It is a vehicular communication system that incorporates other more specific types of communication as a V2I (vehicle-to-infrastructure), a V2N (vehicle-to-network), a V2V (vehicle-to-vehicle), a V2P (vehicle-to-pedestrian), a V2D (vehicle-to-device) and etc. The main motivations for the V2X are road safety, traffic efficiency, and other infotainment applications.

The 3GPP specifies V2X features to support V2X services based on the LTE system in Release-14 (e.g., LTE-V2X), wherein two modes of operation were introduced: 1) communications over peer to peer PC5 interface (e.g., V2V) and 2) communications over LTE-Uu interface (V2N). The link between two peers of PC5 interface is designated as sidelink (e.g., a new communication link). The enhancements of LTE were introduced to support vehicle to vehicle communication use cases. The V2V communication over PC5 interface is supported via two modes: 1) managed mode which operates when the vehicle UE is scheduled by the network, and 2) unmanaged mode which operates when the vehicle UEs communicate independently from the network. In some embodiments the unmanaged mode comprise scheduling and interference management of traffic is supported based on distributed algorithms between vehicle and the managed mode comprises scheduling and interference management of V2V traffic is assisted via the base station (eNB) by control signaling over the UE interface In LTE V2X, the design was based on broadcast mechanism, and no optimization was specified for unicast case.

Described herein is a demodulation reference signal (DMRS) in LTE-V2X. In order to handle high relative vehicle speeds (e.g., doppler shift/frequency offset) up to 500 Km/h, DMRS with increased density compared to LTE is specified for LTE-V2X. Since LTE-V2X is designed for broadcast, no change of DMRS density (i.e., only fixed number of DMRS symbols in a slot) is supported.

The NR is a completely new air interface being developed for 5G. It is being developed in 3GPP from the ground up in order to support the wide variety of services, devices and deployments 5G will encompass, and across diverse spectrum. The DMRS specified in NR is UE specific, and used by a receiver for radio channel estimation for demodulation of associated physical channel. The system can beamform the DMRS, keep it within a scheduled resource, and transmit it only when necessary in either DL or UL. Additionally, multiple orthogonal DMRSs can be allocated to support MIMO transmission. The network presents users with DMRS information early on for the initial decoding requirement that low-latency applications need. The DMRS density (i.e., the number of OFDM symbols in a slot) can be different and the configuration of DMRS is signaled to the UE. For example, the base station might increase the rate of transmission of DMRS signal (called "additional DMRS") to track fast changes in channel. However, how the base station (gNB) select a DMRS configuration for a UE is decided purely inside the base station where the UE has no way to influence and feedback whether that DMRS configuration is suitable or not.

In some embodiments, the sidelink design for NR can comprise the following channels: A physical sidelink control channel (PSCCH), a physical sidelink shared channel (PSSCH), a physical sidelink broadcast channel (PSBCH), and a physical sidelink feedback channel (PSFCH). In some embodiments, at least the PSCCH and PSSCH may contain DMRS for the receiver to demodulate the channel.

Currently, the study of using NR air interface to support advanced V2X applications is conducted in 3GPP. The NR-V2X is designed to support unicast and groupcast in additional to broadcast. Thus, there is a necessity to adapt DMRS configurations for V2X use cases considering different environment (e.g., low speed or high speed, managed mode or unmanaged mode of V2V) and traffic types.

The DMRS (e.g., patterns applied on a slot) can be used to handle Doppler frequency shift/spread for line-of-sight conditions. Doppler frequency shift is similar to receive signal carrier frequency offset and results in a phase offset between different OFDM symbols in the received signal. The offset can be compensated prior to demodulation processing. The DMRS signals can be used to make an estimate of the phase offset, which is then used to compensate it on the data OFDM symbols for a given SL channel.

Using smaller spacing between the DMRS symbols in the time domain provides better channel interpolation accuracy. The maximum carrier frequency offset which can be estimated at the UE side is inversely proportional to the DMRS spacing in time domain. So, smaller temporal spacing of the DMRS signals corresponds to the ability of the receiver to handle higher carrier frequency offsets in order to accurately reproduce a transmitted signal as an output of the received path. Similarly, high DMRS density in frequency domain also provides more accurate channel estimation to counter frequency fading. However, smaller spacing (e.g., high DMRS density) of DMRS signals in general has larger overhead and hence reduce the available number of data symbols in the resource block.

Figure 2:
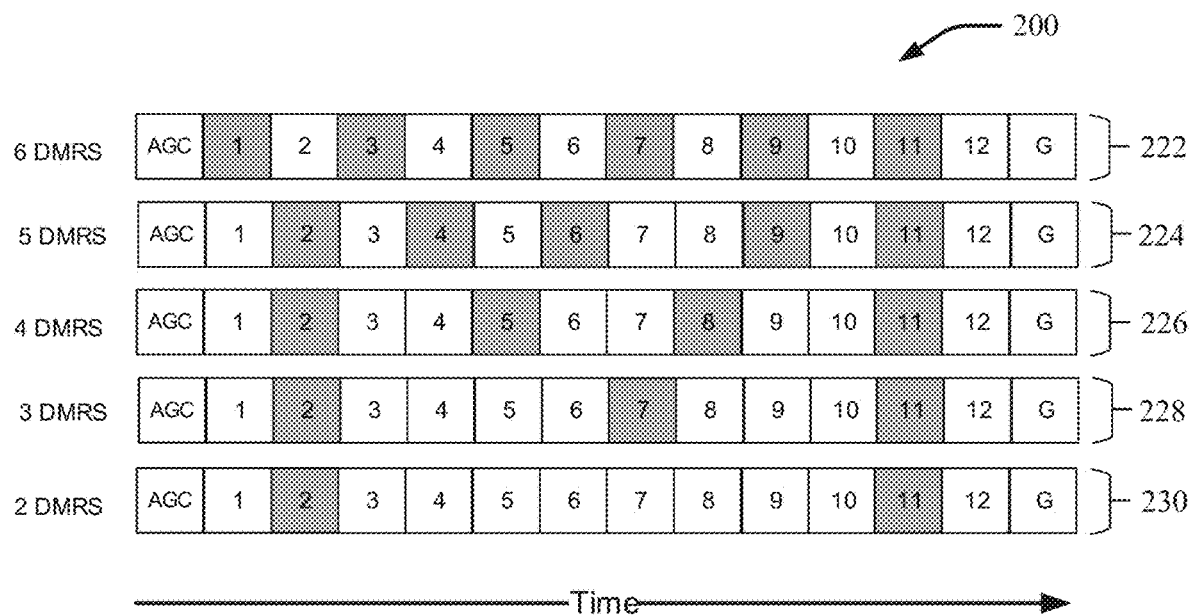
FIG. 2 illustrates a non-limiting example of DMRS patterns in time domain and frequency domain for the PSSCH accordance with various aspects and embodiments of the subject disclosure.
Figure 2:
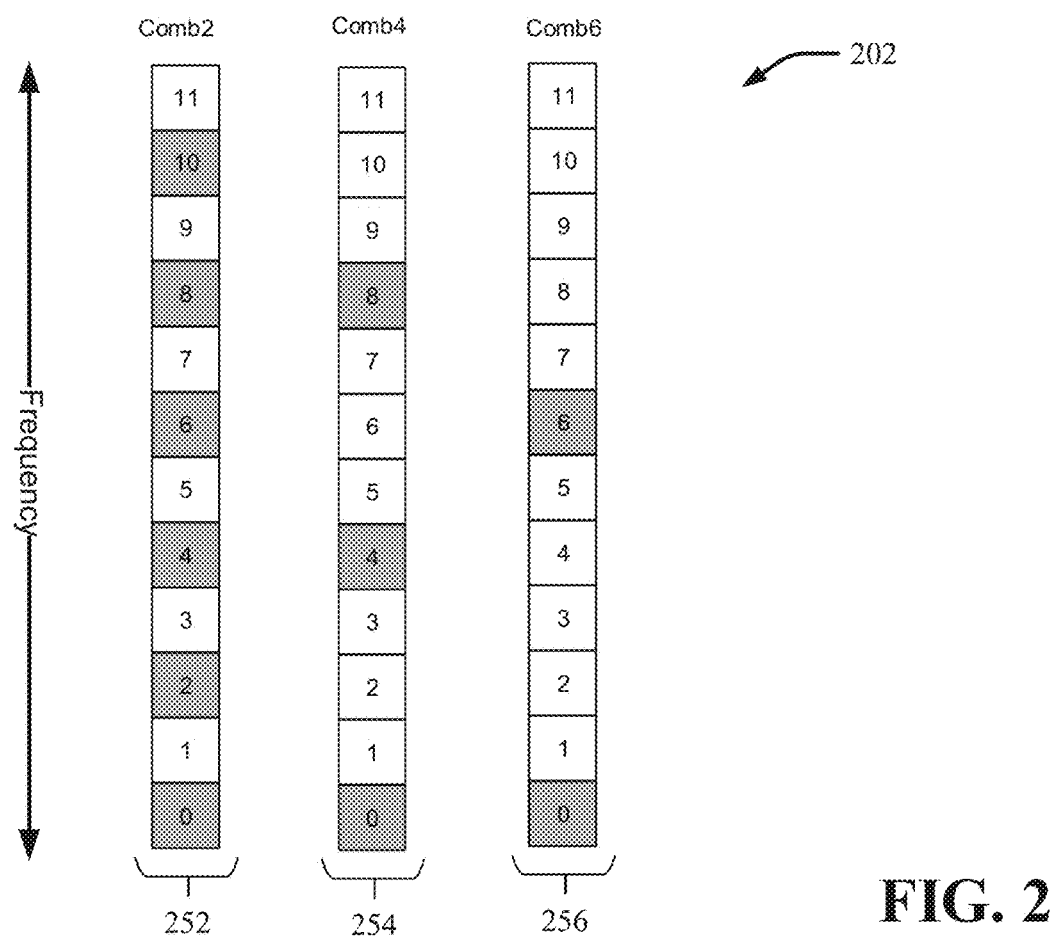

Referring now to FIG. 2 that illustrates a non-limiting example of DMRS patterns in time domain 200 and frequency domain 202 for the PSSCH accordance with various aspects and embodiments of the subject disclosure. In some embodiments, 5 different time domain DMRS patterns 222-230 are illustrated and 3 frequency domain DMRS patterns 252-256 are illustrated. In some embodiments, for a given timeslot, the time domain DMRS pattern 222 can comprise 6 symbols allocated to DMRS (1, 3, 5, 7, 9 and 11). In some embodiments, for a given timeslot, the time domain DMRS pattern 224 can comprise 5 symbols allocated to DMRS (2, 4, 6, 9 and 11). In some embodiments, for a given timeslot, the time domain DMRS pattern 226 can comprise 4 symbols allocated to DMRS (2, 5, 8 and 11). In some embodiments, for a given timeslot, the time domain DMRS pattern 228 can comprise 3 symbols allocated to DMRS (2, 7 and 11). In some embodiments, for a given timeslot, the time domain DMRS pattern 230 can comprise 2 symbols allocated to DMRS (2 and 11).

In some embodiments, for a portion of frequency (e.g., density), the frequency domain DMRS pattern 252 can comprise 6 subcarriers are allocated to DMRS (0, 2, 4, 6, 8 and 10). In some embodiments, for a portion of frequency (e.g., density), the frequency domain DMRS pattern 254 can comprise 3 subcarriers allocated to DMRS (0, 4 and 8). In some embodiments, for a portion of frequency (e.g., density), the frequency domain DMRS pattern 256 can comprise 2 subcarriers allocated to DMRS (0 and 6).

In some embodiment, the time domain DMRS patterns 222-230 can correspond to the frequency domain DMRS patterns 252-256. In some embodiments, a DMRS configuration is referring to the combination of DMRS pattern in time and frequency domain. Note that, other patterns such as comb 1 (i.e. all 12 subcarriers from 0 to 11 are collocated to DMRS) and comb 3 (e.g., 0, 3, 6 and 9 subcarriers are allocated to DMRS) not shown in FIG. 2 can also be considered. Also, specific allocation of symbol or subcarrier for a given pattern can be modified based on information processed by the system. For example, the frequency domain DMRS pattern 254 can have subcarrier 3, 5 and 8 allocated for DMRS (not shown).

In some embodiments, the transmitter UE determines the DMRS configuration for V2X communication based on one or more of the following criteria:
  Pre-configured for traffic type, unicast, groupcast or broadcast
  Resource allocation for PSCCH and associated PSSCH
  Downlink Control Information (DCI) or Radio Resource Controller (RRC) or MAC CE signaling from the base station to which the transmitter UE is in the coverage and associated
  Relative speed between the transmitter UE and the receiver UE. This may be obtained from application layer.
  Explicit feedback with respect to the match of DMRS configuration to the operating environment from the receiver UE. It is designated as DMRS match index in this disclosure.

Figure 3:
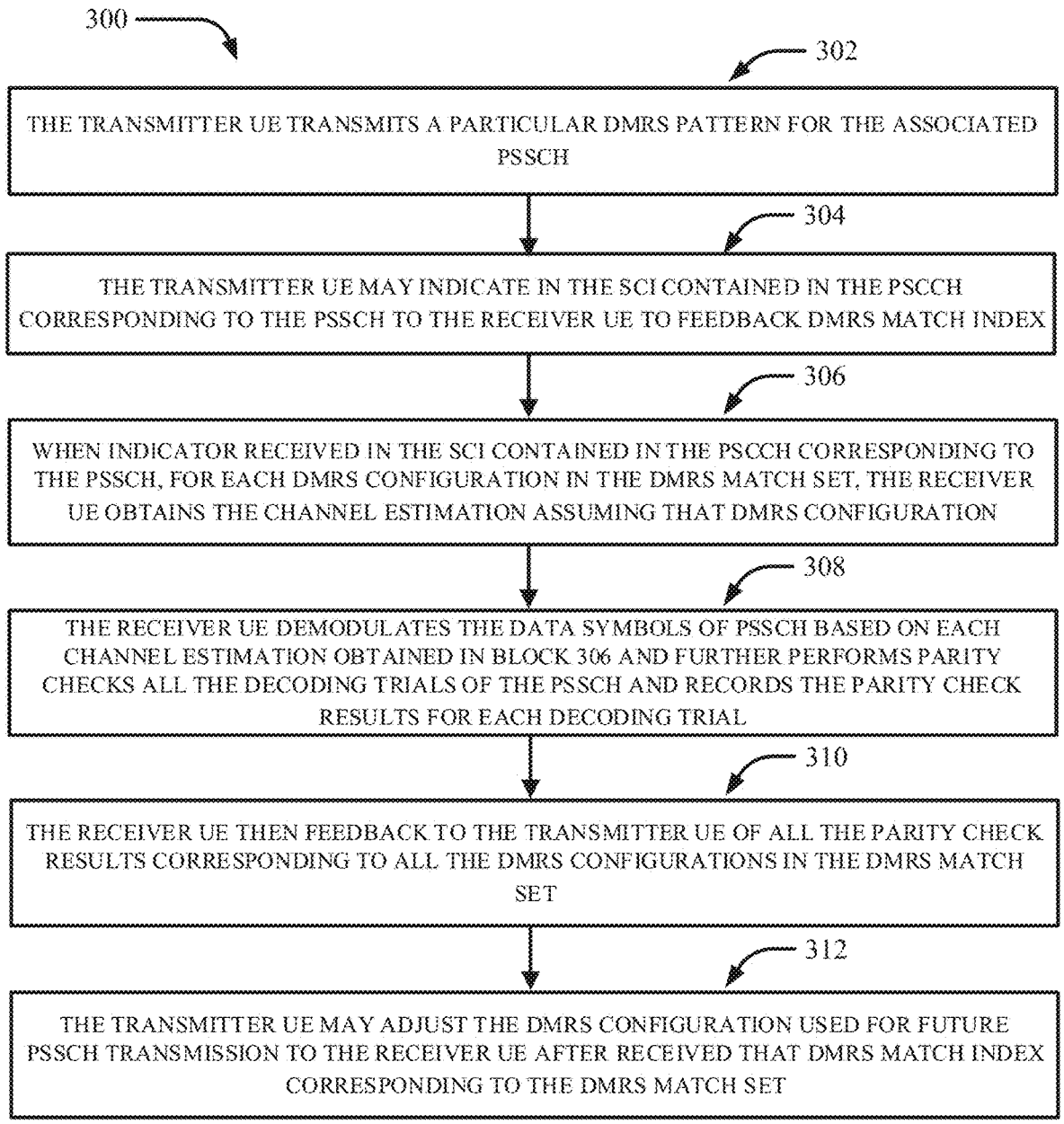
FIG. 3 illustrates a block diagram of non-limiting example of method that facilitates DMRS configuration and adaptation in accordance with various aspects and embodiments described herein.

In some embodiments, correspondingly, the DMRS configuration is derived at the receiver UE based on one of the following criteria:
  Pre-configured for traffic type, unicast, groupcast or broadcast
  Pre-configured rules for resource allocation for PSCCH and associated PSSCH
  DCI or RRC or (Medium Access Control (MAC) Control Element (CE) signaling from the base station to which the receiver UE is in the coverage and associated
  Explicitly indicated in the service class indicator (SCI) contained in PSCCH from the receiver UE Referring now to FIG. 3, illustrated is a block diagram of non-limiting example of method that facilitates DMRS configuration and adaptation in accordance with various aspects and embodiments described herein. Repetitive description of like elements employed in other embodiments described herein is omitted for sake of brevity. In some embodiments, the transmitter UE and the receiver UE to adapt DMRS configuration based on DMRS match index feedback in unmanaged mode V2X as illustrated in blocks 302-312. Block 302 depicts the transmitter UE transmits a particular DMRS pattern for the associated PSSCH. Block 304 depicts the transmitter UE may indicate in the SCI contained in the PSCCH corresponding to the PSSCH to the receiver UE to feedback DMRS match index. This indicator is corresponding to a set of DMRS configurations (designated as DMRS match set) which may include the actual DMRS configuration used in the PSSCH. Block 306 depicts when indicator received in the SCI contained in the PSCCH corresponding to the PSSCH, for each DMRS configuration in the DMRS match set, the receiver UE obtains the channel estimation assuming that DMRS configuration. Block 308 depicts the receiver UE demodulates the data symbols of PSSCH based on each channel estimation obtained in block 306 and further performs parity checks all the decoding trials of the PSSCH and records the parity check results for each decoding trial. Block 310 depicts the receiver UE then feedback to the transmitter UE of all the parity check results corresponding to all the DMRS configurations in the DMRS match set. Note that the actual DMRS configuration on which hybrid automatic repeat request (HARM) feedback is based is assumed to be known at the receiver via pre-configuration/SCI/DCI/RRC/MAC CE signaling. Similarly, it is also assumed that modulation coding scheme (MCS) and data region of PSSCH is known to the receiver UE via pre-configuration/SCI/DCI/RRC/MAC CE signaling. Block 312 depicts the transmitter UE may adjust the DMRS configuration used for future PSSCH transmission to the receiver UE after received that DMRS match index corresponding to the DMRS match set. The above procedure can be enabled by the transmitter UE dynamically or periodically. Note that, in some embodiments, all the control signaling, and feedback mentioned in above procedure may also be carried by MAC CE/RRC/DCI.

Figure 4:
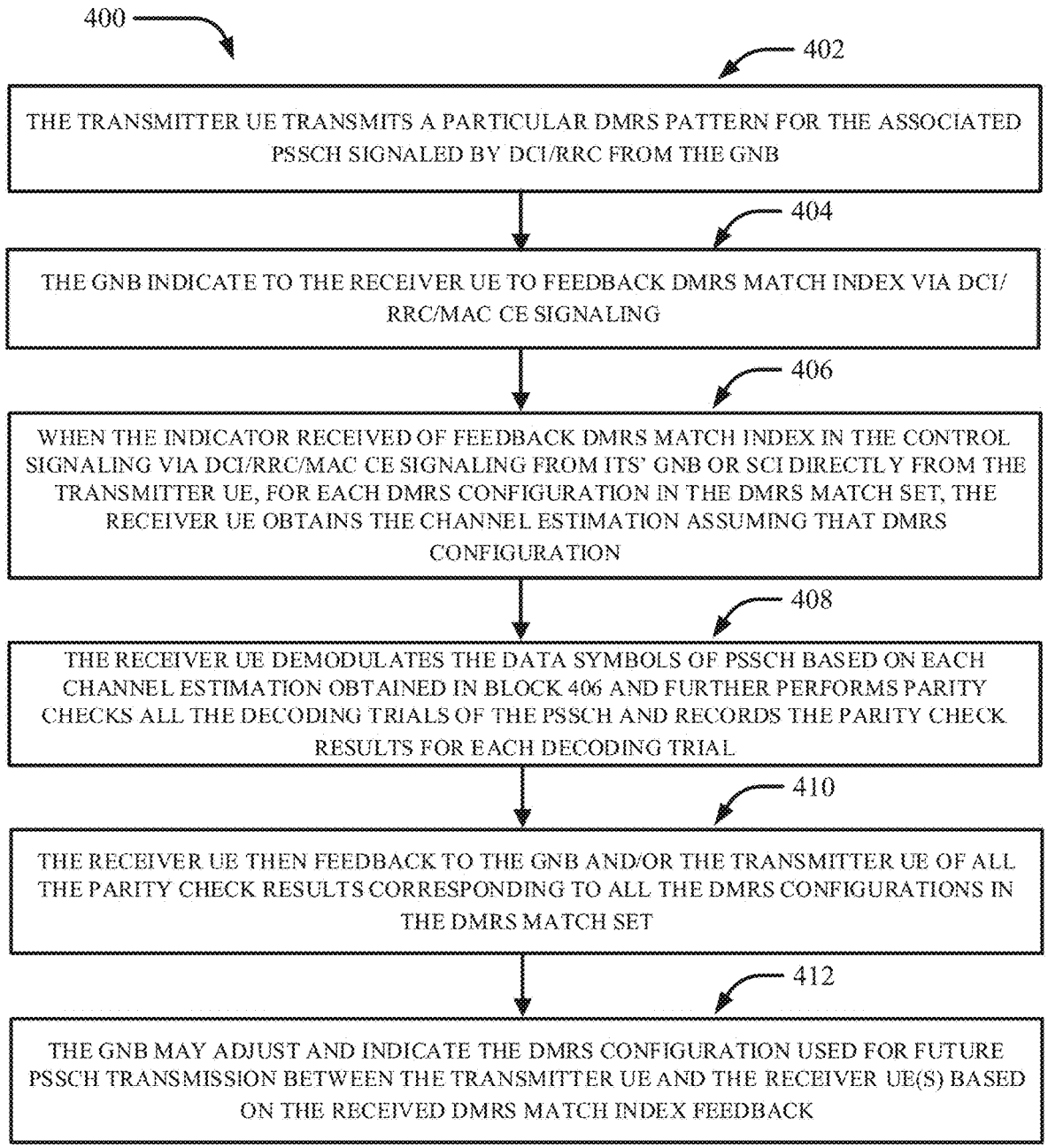
FIG. 4 illustrates a block diagram of non-limiting example of method that facilitates DMRS configuration and adaptation in accordance with various aspects and embodiments described herein.

Referring now to FIG. 4, illustrated is a block diagram of non-limiting example of method that facilitates DMRS configuration and adaptation in accordance with various aspects and embodiments described herein. Repetitive description of like elements employed in other embodiments described herein is omitted for sake of brevity. In some embodiments, the transmitter UE and the receiver UE to adapt DMRS configuration based on DMRS match index feedback in managed mode V2X as illustrated in blocks 402-412. Block 402 depicts the transmitter UE transmits a particular DMRS pattern for the associated PSSCH signaled by DCI/RRC from the gNB. Block 404 depicts the gNB indicate to the receiver UE to feedback DMRS match index via DCI/RRC/MAC CE signaling. The gNB may indicate to the transmitter UE to feedback DMRS match index via DCI/RRC/MAC CE signaling as well. This indicator is corresponding to a set of DMRS configurations (designated as DMRS match set) which may include the actual DMRS configuration used in the PSSCH. Block 406 depicts when the indicator received of feedback DMRS match index in the control signaling via DCI/RRC/MAC CE signaling from its' gNB or SCI directly from the transmitter UE, for each DMRS configuration in the DMRS match set, the receiver UE obtains the channel estimation assuming that DMRS configuration. Block 408 depicts the receiver UE demodulates the data symbols of PSSCH based on each channel estimation obtained in block 406 and further performs parity checks all the decoding trials of the PSSCH and records the parity check results for each decoding trial. Block 410 depicts the receiver UE then feedback to the gNB and/or the transmitter UE of all the parity check results corresponding to all the DMRS configurations in the DMRS match set. If signaled (e.g., as depicted in block 404), the transmitter UE may forward such feedback to the gNB of all the parity check results corresponding to all the DMRS configurations in the DMRS match set. Alternatively, the transmitter UE may feedback the DMRS match index based on HARQ-NACK from the group members in case of groupcast, instead of every receiver's match index to gNB. Block 412 depicts the gNB may adjust and indicate the DMRS configuration used for future PSSCH transmission between the transmitter UE and the receiver UE(s) based on the received DMRS match index feedback. In some embodiments, for example, when the traffic is broadcast, the transmitter UE will always choose 6 DMRS symbols in time domain and comb 2 in frequency domain for both PSCCH and associated PSSCH. This rule can be pre-configured by the network or fixed in the specification so that the receiver UE is aware of.

Figure 5:
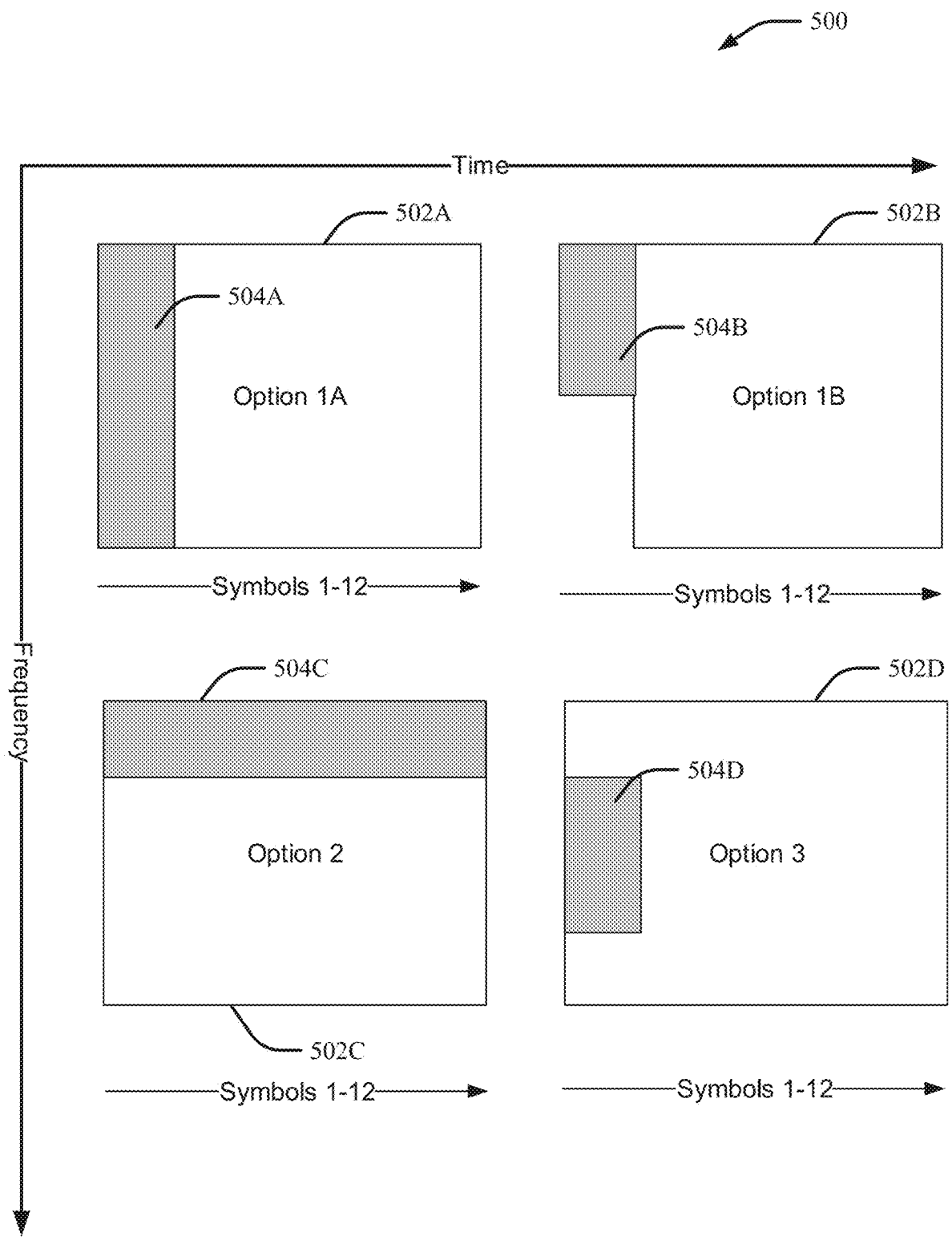
FIG. 5 illustrates several non-limiting examples of PSCCH and PSSCH multiplexing in accordance with various aspects and embodiments described herein.

Referring now to FIG. 5, illustrated several non-limiting examples of PSCCH and PSSCH multiplexing in accordance with various aspects and embodiments described herein. Repetitive description of like elements employed in other embodiments described herein is omitted for sake of brevity. In some embodiments, in one example, if the resource allocation for PSCCH 504A and associated PSSCH 502A occurs in the same slot where PSCCH 504A is assigned to be symbol #1 and #2, with all the rest symbols from #3 to #12 as PSSCH (e.g., Option 1A, 1B and 3 in FIG. 5), then the transmitter UE may choose 5 DMRS symbols in time domain and comb 2 in frequency domain. As discussed above in FIG. 2, for pattern 224, 1 of DMRS symbol (e.g., #2) can be PSCCH region and 4 DMRS symbols (e.g., #4, #6, #9, #11 as in FIG. 2) for PSSCH region.

In some embodiments, in another example, if the resource allocation for PSCCH 504A and associated PSSCH 502A multiplexed in frequency domain (e.g., as in Option 2), the transmitter UE may choose 6 DMRS symbols pattern 222 in time domain and Comb2 pattern 252 in frequency domain for PSCCH region 504C while choose 4 DMRS symbols pattern 226 in time domain and comb 3 (not shown) in frequency domain for PSSCH region 502C. It should be noted that DMRS configuration rule can be pre-configured by the network or fixed in the specification for a particular resource allocation so that the receiver UE is aware of the DMRS configuration given the corresponding resource allocation.

In some embodiments, in a managed mode of V2X, without loss of generality, it is assumed both the transmitter UE and the receiver UE are in the coverage of a gNB. The gNB indicates the DMRS configuration to be used for the transmitter UE and the receiver UE pair using DCI and/or RRC and/or MAC CE signaling to both UEs. The selection of DMRS configuration may be based on the characteristic of data traffic and/or the relative speed between the UE pair. The relative vehicle speed may be estimated by the gNB itself based on the UEs' UL transmission to the gNB and/or by a positioning server (e.g., a roadside unit) based on some positioning techniques. For example, the gNB may RRC configure 6 DMRS symbols in time domain and comb 2 in frequency domain for PSCCH and associated PSSCH in case of high data rate traffic requiring high MCS and/or MIMO (Multiple input multiple output) and hence high accuracy requirement on channel estimation. It may then DCI signal to change the DMRS configuration to be 4 symbols in time domain and comb 4 in frequency domain for some different data rate and/or if the relative vehicle speed is lower than some threshold. The DMRS configuration with even lower density can be signaled for instance to pedestrian UE pair.

In some embodiments, in the unmanaged mode of V2X, the transmitter UE and the receiver UE adapt the DMRS configuration via feedback. For example, the following describes set of DMRS configurations. Assume for time domain, 1, 2, 3, 4, 5, 6 symbols are employed and for frequency domain, Comb 1 (not shown), Comb 2 (252 of FIG. 2), Comb 3 (not shown), Comb 4 (254 of FIG. 2) and Comb 6 (256 of FIG. 2) are employed. As an example, the DMRS pattern can be represented as TxC where T represents the number of DMRS symbols in time domain while C stands for the comb structure. For example, the set of all configurations can be [6x1, 6x2, 6x3, 6x4, 6x6; 5x1, . . . , 5x6; . . . , 1x1, . . . , 1x6]. Alternatively, a 30 bitmap can be used to indicate this whole DMRS configuration set where each bit is corresponding to a DMRS configuration in order. For instance, 0x00000001 where each digit is a hexadecimal number is corresponding to 1 symbol in time domain and comb 6 in frequency domain DMRS pattern. Another example, 0x3E000000 is corresponding to the set of 5 DMRS configurations with 6 symbols in time domain and comb 1, 2, 3, 4 and 6 respectively.

In some examples, the transmitter UE may choose 6 DMRS symbols in time domain and comb (e.g., frequency shift) 2 in frequency domain as the DMRS configuration for PSSCH and also indicate the DMRS match set to include 4 DMRS symbols in time domain and comb 3 in frequency domain and 2 DMRS symbols in time domain and comb 4 in frequency domain. The used DMRS configuration (6x2)

and DMRS match set ([4x3, 2x4]) information are indicated to the receiver UE in the SCI.

At the receiver UE, the estimates the channel three times assuming 6x2, 4x3 and 2x4 DMRS patterns. Furthermore, the receiver UE decodes the same PSSCH based three channel estimation and parity checks all three decoding trials. For instance, if the results corresponding to 6x2 and 4x3 passed parity check while the one corresponding to 2x4 failed, the receiver UE will feedback both HARQ-ACK and [positive, negative] as the DMRS match index to the transmitter UE. The transmitter UE then may choose 4x3 as the DMRS configuration for future PSSCH transmission. The transmitter UE may indicate some other DMRS match set in future PSSCH transmission in order to track and further adapt to the sidelink channel.

In some embodiments, in the managed mode of V2X, the gNB may adapt the DMRS configuration between the transmitter UE and the receiver UE(s) via closed-loop feedback. In some embodiments, the gNB indicates the DMRS configuration to be used using DCI and/or RRC and/or MAC CE signaling to all intended UEs (the transmitter UE and the receiver UE in case of unicast, the transmitter UE and the group of receiver UEs in case of groupcast).

In some embodiments, the gNB may choose 4 DMRS symbols in time domain and comb 2 in frequency domain as the DMRS configuration for PSSCH. The gNB may indicate DMRS match set ([4x3, 3x3]) to the transmitter UE if the receiver UE is out of coverage of this gNB. The transmitter UE may indicate DMRS match set ([4x3, 3x3]) to the receiver UE following the procedure for unmanaged mode V2X to obtain the DMRS match index from the receiver UE and forward this feedback to the gNB. In some embodiments, the gNB may indicate the transmitter UE to feedback the DMRS match index in case of groupcast to avoid large feedback signaling overhead due to multiple receiver UEs. Instead of conducting the DMRS adaption procedure for unmanaged mode V2X for each receiver UE, the transmitter UE may generate and feedback the DMRS match index based on the HARQ-NACK from the group members.

The advantage is that the described embodiments of DMRS configuration and adaptation enables efficient DMRS utilization in V2X by providing the ability to adapt to the sidelink and traffic characteristic. In some embodiments, DMRS configuration based on the traffic type, resource allocation for PSCCH and PSSCH. In some embodiments, DMRS configuration adaptation based on side information and associated signaling and procedure. In some embodiments, DMRS configuration adaptation with associated signaling and procedure based closed-loop feedback from the UE(s).

Figure 6:
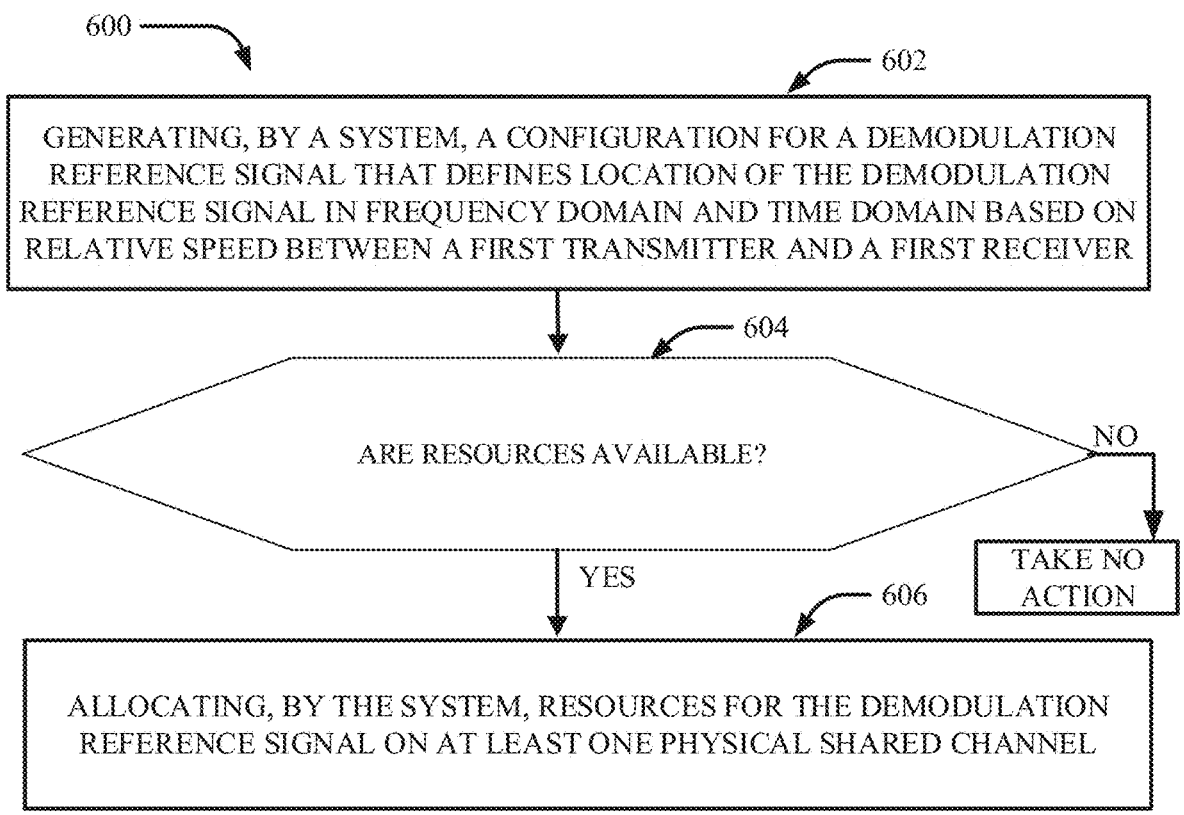
FIG. 6 depicts a diagram of an example, non-limiting computer implemented method that facilitates demodulation reference signal configuration and adaptation in accordance with one or more embodiments described herein.

FIG. 6 depicts a diagram of an example, non-limiting computer implemented method that facilitates DMRS configuration and adaptation in accordance with one or more embodiments described herein. Repetitive description of like elements employed in other embodiments described herein is omitted for sake of brevity. In some examples, flow diagram 600 can be implemented by operating environment 1200 described below. It can be appreciated that the operations of flow diagram 600 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts generating, by the system comprising a processor and one or more components, a configuration for a demodulation reference signal that defines location of the demodulation reference signal in frequency domain and time domain based on relative speed between a first transmitter and a first receiver. Operation 604 depicts determining if resources are available to implement the generated configuration. If the resources are available to implement the generated configuration, then perform operation 606. Otherwise, take no action and continue monitoring the connection. Operation 606 depicts, allocating, by the system, resources for the demodulation reference signal on at least one physical shared channel.

Figure 7:
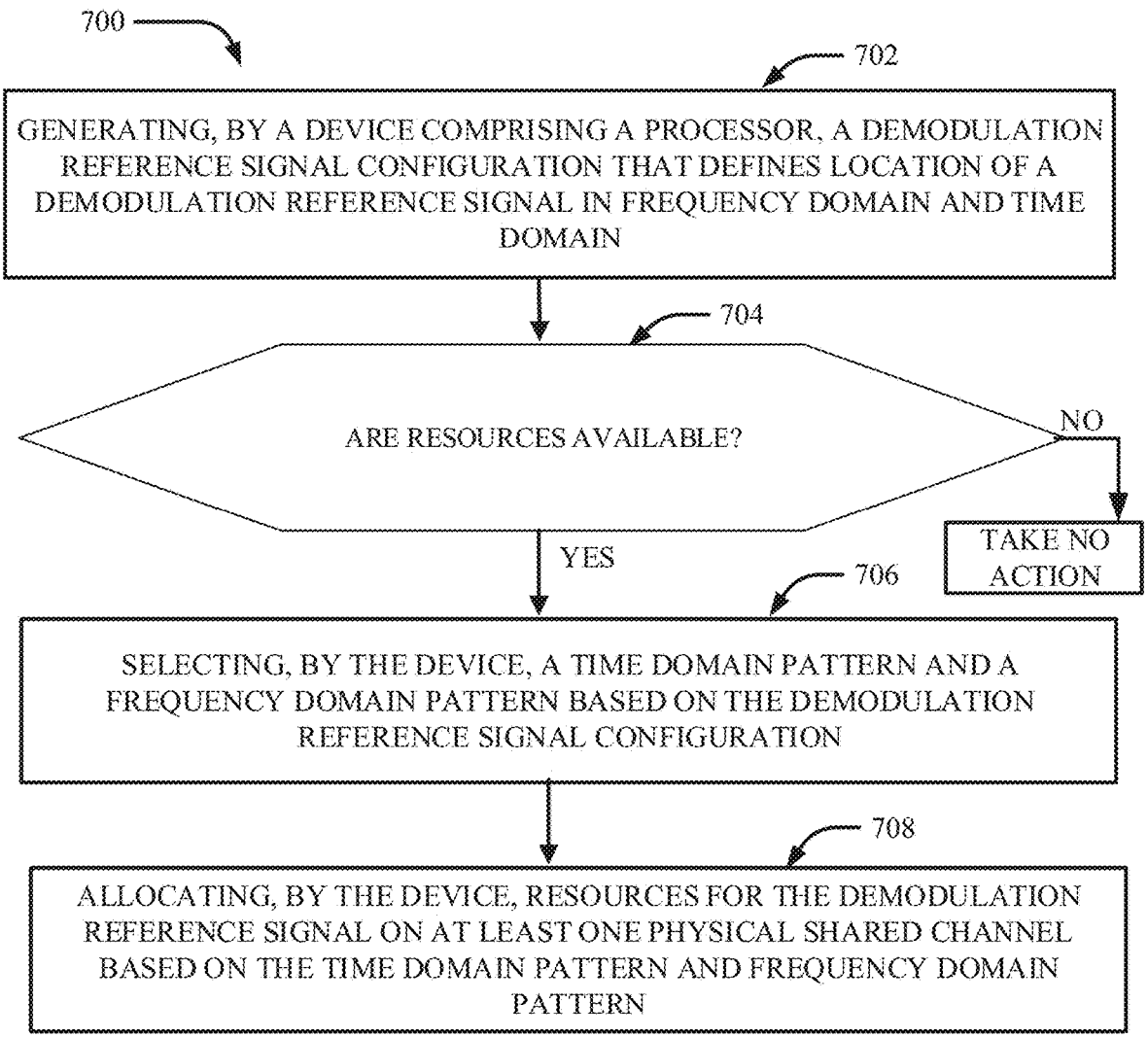
FIG. 7 depicts a diagram of an example, non-limiting computer implemented method that facilitates demodulation reference signal configuration and adaptation in accordance with one or more embodiments described herein.

FIG. 7 depicts a diagram of an example, non-limiting computer implemented method that facilitates DMRS configuration and adaptation in accordance with one or more embodiments described herein. Repetitive description of like elements employed in other embodiments described herein is omitted for sake of brevity. In some examples, flow diagram 700 can be implemented by operating environment 1200 described below. It can be appreciated that the operations of flow diagram 700 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts generating, by a device comprising a processor, a demodulation reference signal configuration that defines location of a demodulation reference signal in frequency domain and time domain. Operation 704 depicts determining if resources are available to implement the generated configuration. If the resources are available to implement the generated configuration, then perform operation 706. Otherwise, take no action and continue monitoring the connection. Operation 706 depicts, selecting, by the device, a time domain pattern and a frequency domain pattern based on the demodulation reference signal configuration. Operation 708 depicts, allocating, by the device, resources for the demodulation reference signal on at least one physical shared channel based on the time domain pattern and frequency domain pattern.

Figure 8:
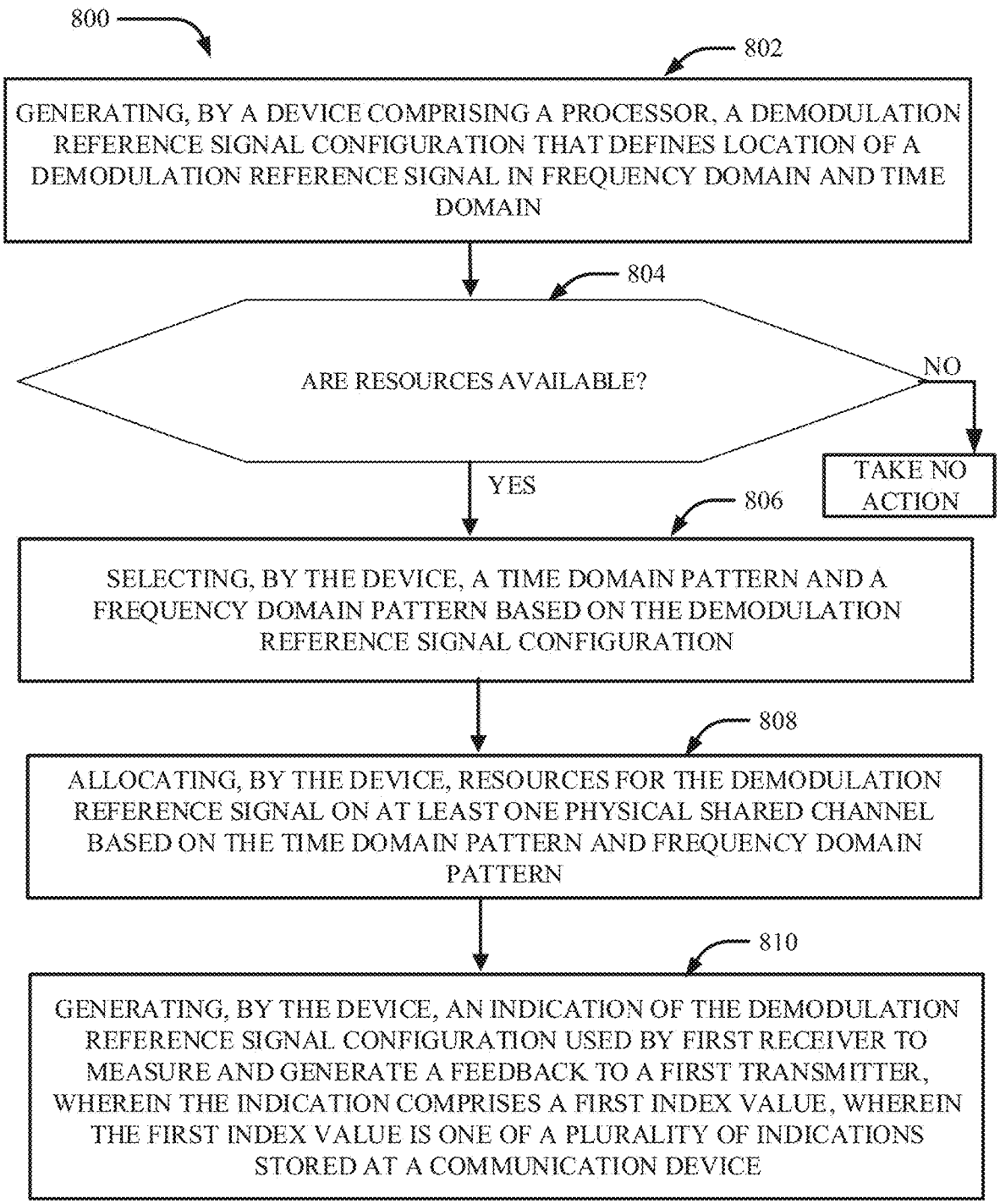
FIG. 8 depicts a diagram of an example, non-limiting computer implemented method that facilitates demodulation reference signal configuration and adaptation in accordance with one or more embodiments described herein.

FIG. 8 depicts a diagram of an example, non-limiting computer implemented method that facilitates DMRS configuration and adaptation in accordance with one or more embodiments described herein. Repetitive description of like elements employed in other embodiments described herein is omitted for sake of brevity. In some examples, flow diagram 800 can be implemented by operating environment 1200 described below. It can be appreciated that the operations of flow diagram 800 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts generating, by a device comprising a processor, a demodulation reference signal configuration that defines location of a demodulation reference signal in frequency domain and time domain. Operation 804 depicts determining if resources are available to implement the generated configuration. If the resources are available to implement the generated configuration, then perform operation 806. Otherwise, take no action and continue monitoring the connection. Operation 806 depicts, selecting, by the device, a time domain pattern and a frequency domain pattern based on the demodulation reference signal configuration. Operation 808 depicts, allocating, by the device, resources for the demodulation reference signal on at least one physical shared channel based on the time domain pattern and frequency domain pattern. Operation 810 depicts, generating, by the device, an indication of the demodulation reference signal configuration used by first receiver to measure and generate a feedback to a first transmitter, wherein the indication comprises a first index value, wherein the first index value is one of a plurality of indications stored at a communication device.

Figure 9:
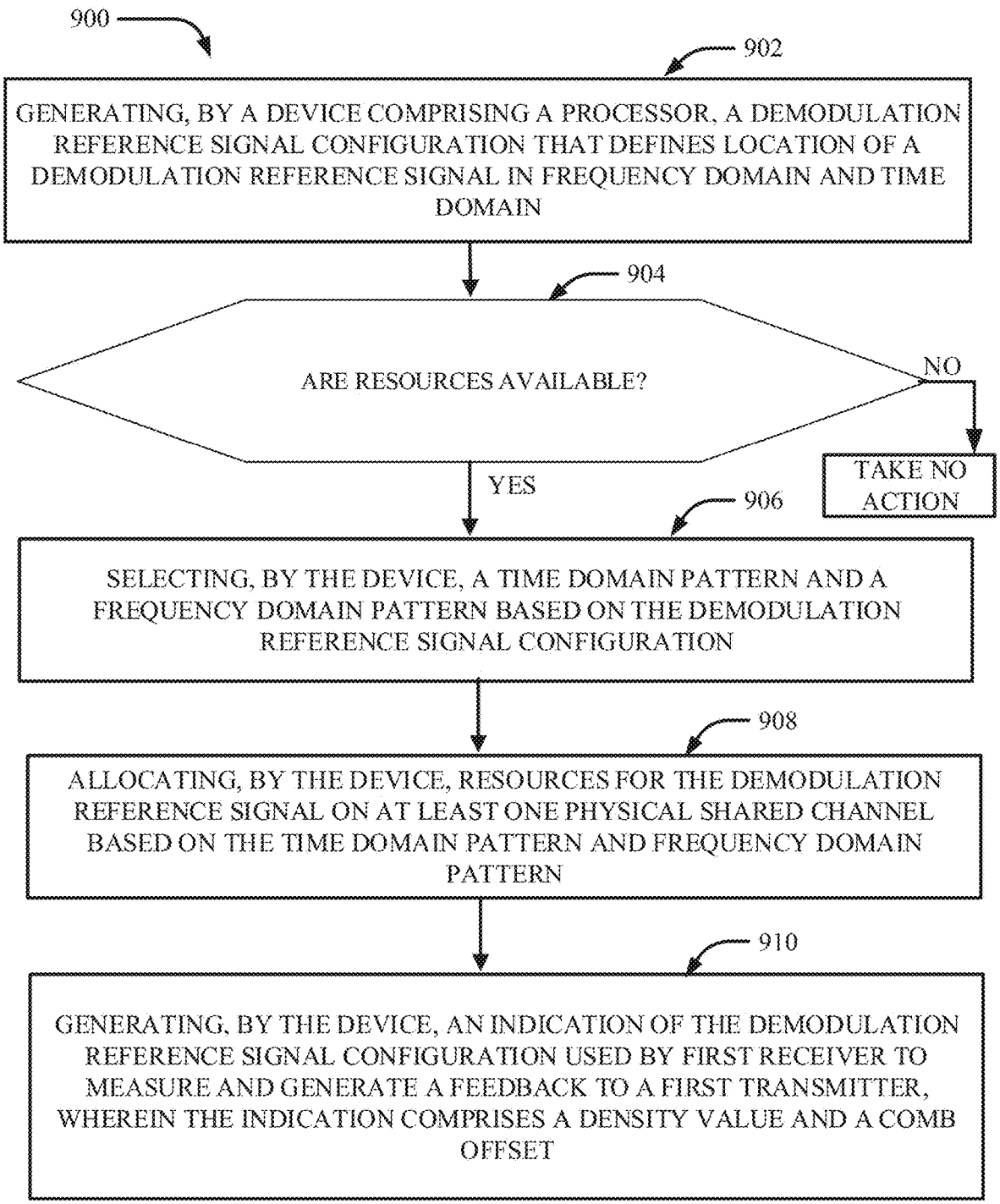
FIG. 9 depicts a diagram of an example, non-limiting computer implemented method that facilitates demodulation reference signal configuration and adaptation in accordance with one or more embodiments described herein.

FIG. 9 depicts a diagram of an example, non-limiting computer implemented method that facilitates DMRS configuration and adaptation in accordance with one or more embodiments described herein. Repetitive description of like elements employed in other embodiments described herein is omitted for sake of brevity. In some examples, flow diagram 900 can be implemented by operating environment 1200 described below. It can be appreciated that the operations of flow diagram 900 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts generating, by a device comprising a processor, a demodulation reference signal configuration that defines location of a demodulation reference signal in frequency domain and time domain. Operation 904 depicts determining if resources are available to implement the generated configuration. If the resources are available to implement the generated configuration, then perform operation 906. Otherwise, take no action and continue monitoring the connection. Operation 906 depicts, selecting, by the device, a time domain pattern and a frequency domain pattern based on the demodulation reference signal configuration. Operation 908 depicts, allocating, by the device, resources for the demodulation reference signal on at least one physical shared channel based on the time domain pattern and frequency domain pattern. Operation 910 depicts, generating, by the device, an indication of the demodulation reference signal configuration used by first receiver to measure and generate a feedback to a first transmitter, wherein the indication comprises a density value and a comb offset.

Figure 10:
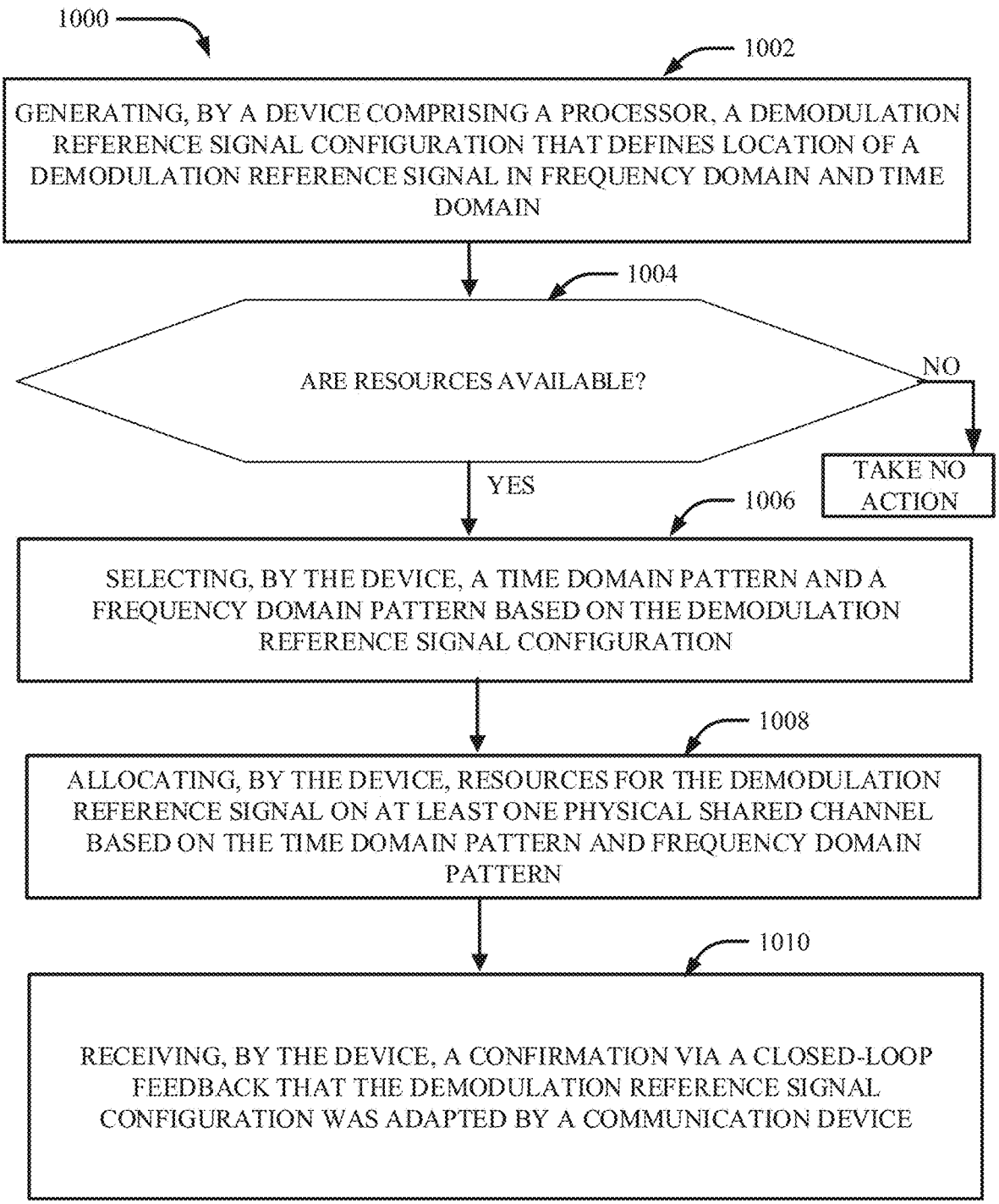
FIG. 10 depicts a diagram of an example, non-limiting computer implemented method that facilitates demodulation reference signal configuration and adaptation in accordance with one or more embodiments described herein.

FIG. 10 depicts a diagram of an example, non-limiting computer implemented method that facilitates DMRS configuration and adaptation in accordance with one or more embodiments described herein. Repetitive description of like elements employed in other embodiments described herein is omitted for sake of brevity. In some examples, flow diagram 1000 can be implemented by operating environment 1200 described below. It can be appreciated that the operations of flow diagram 1000 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts generating, by a device comprising a processor, a demodulation reference signal configuration that defines location of a demodulation reference signal in frequency domain and time domain. Operation 1004 depicts determining if resources are available to implement the generated configuration. If the resources are available to implement the generated configuration, then perform operation 1006. Otherwise, take no action and continue monitoring the connection. Operation 1006 depicts, selecting, by the device, a time domain pattern and a frequency domain pattern based on the demodulation reference signal configuration. Operation 1008 depicts, allocating, by the device, resources for the demodulation reference signal on at least one physical shared channel based on the time domain pattern and frequency domain pattern. Operation 1010 depicts, receiving, by the device, a confirmation via a closed-loop feedback that the demodulation reference signal configuration was adapted by a communication device.

Figure 11:
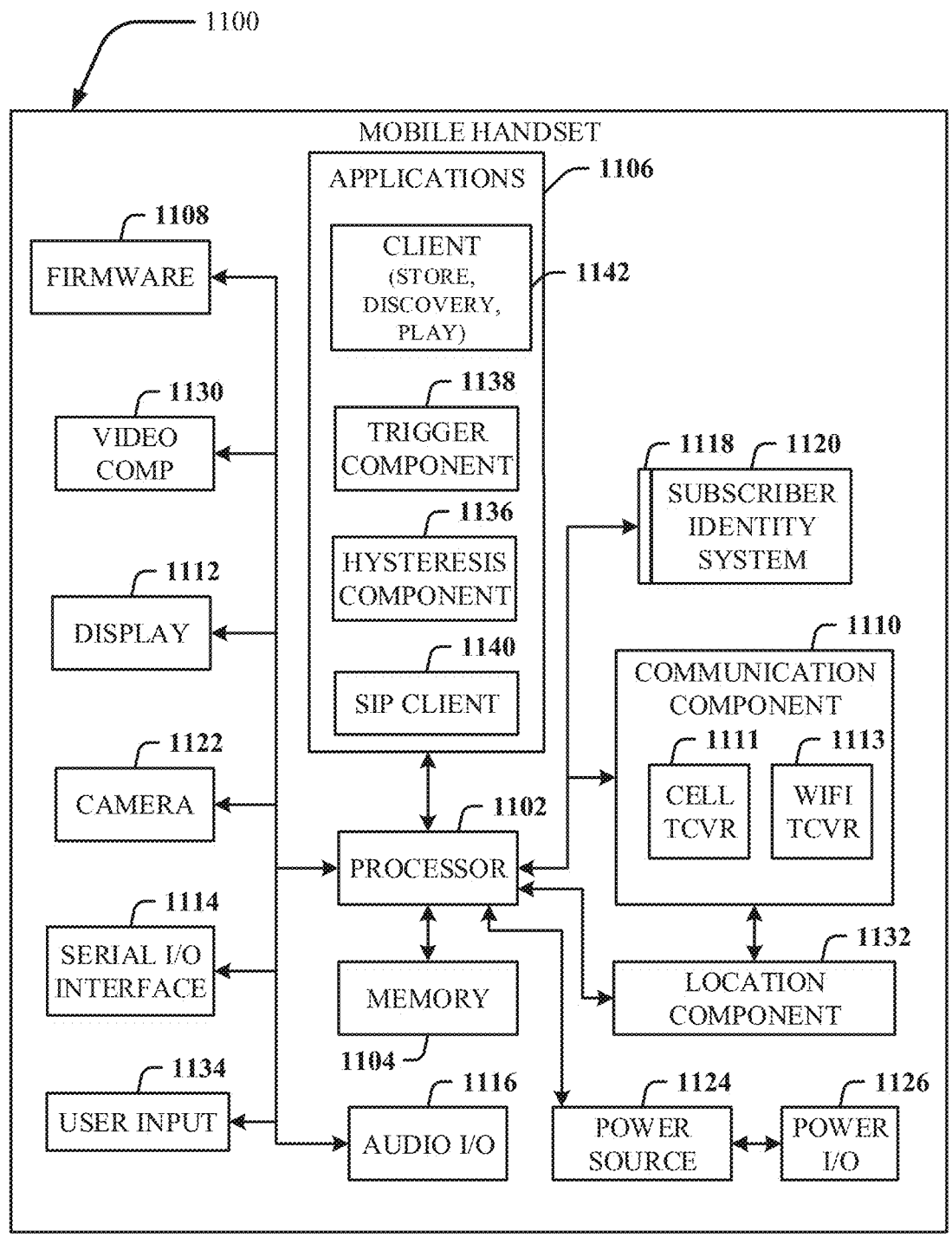
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
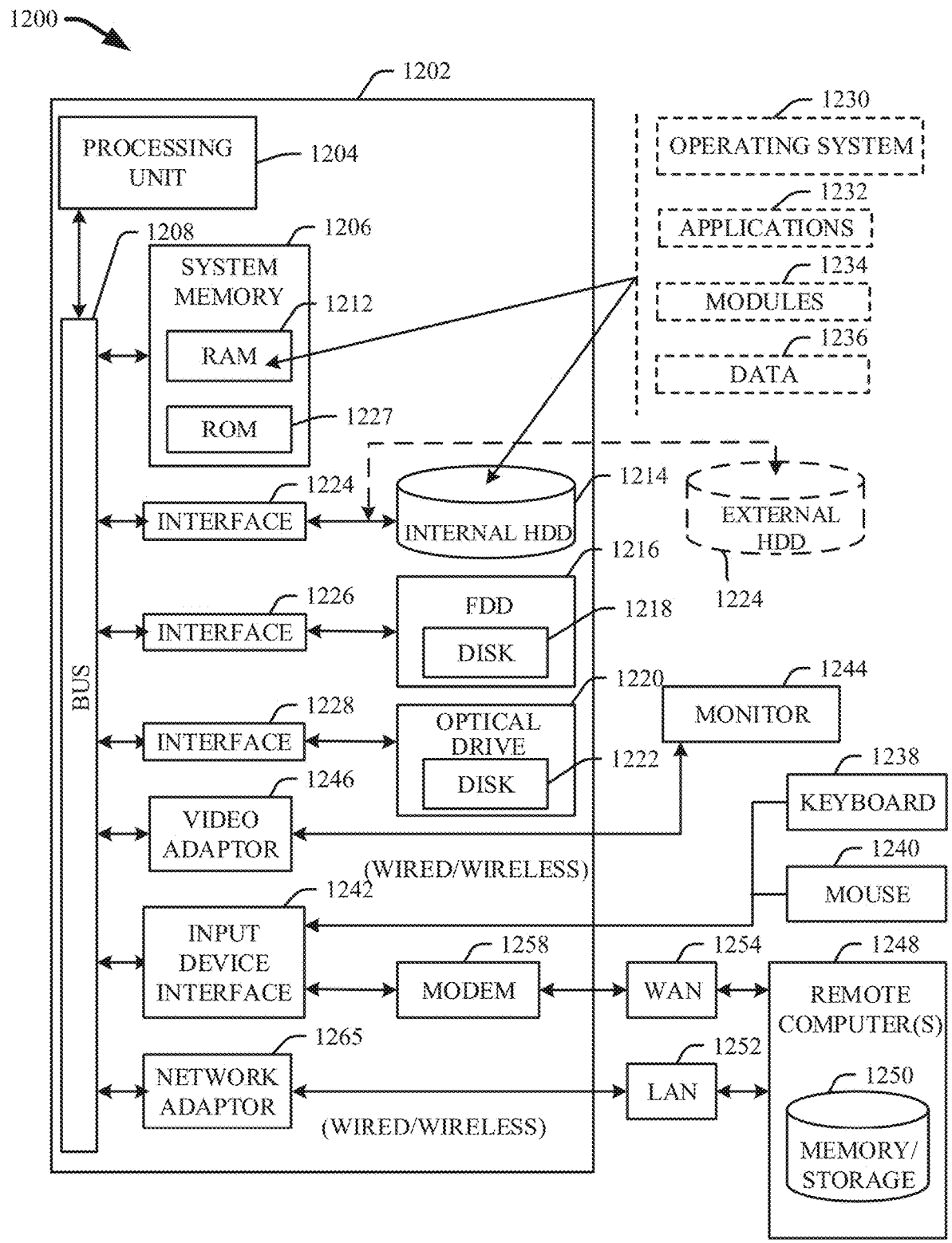
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1202 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices. Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general-purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computer, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1200, which can be, for example, part of the hardware of system 1220, includes a processing unit 1214, a system memory 1206, and a system bus 1218. System bus 1218 couples system components including, but not limited to, system memory 1206 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 894), and Small Computer Systems Interface (SCSI).

System memory 1206 can include volatile memory 1220 and nonvolatile memory 1222. A basic input/output system (BIOS), containing routines to transfer information between elements within computer 1200, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM 1212, which acts as external cache memory. By way of illustration and not limitation, RAM 1212 is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1200 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer 1200. System applications 1230 take advantage of the management of resources by operating system 1228 through program modules 1232 and program data 1234 stored either in system memory 1206 or on disk storage 1224. It is to be noted that the disclosed subject matter can be implemented with various operating systems or combinations of operating systems.

A user can enter commands or information into computer 1200 through input device(s) 1236. As an example, a mobile device and/or portable device can include a user interface embodied in a touch sensitive display panel allowing a user to interact with computer 1200. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1200 and to output information from computer 1200 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1200 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor-based appliance, a peer device, or other common network node and the like, and typically includes many or all of the elements described relative to computer 1200.

For purposes of brevity, only a memory storage device 1246 is illustrated with remote computer(s) 1244. Remote computer(s) 1244 is logically connected to computer 1200 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1200, it can also be external to computer 1200. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
generating a series of demodulation reference signal configurations that define locations of a demodulation reference signal in frequency domain and time domain, wherein demodulation reference signals in the series of demodulation reference signal configurations have different numbers of symbols within the time domain;
selecting a time domain pattern, a number of symbols within the time domain pattern, and a frequency domain pattern based on the series of demodulation reference signal configurations; and
allocating resources for the demodulation reference signal on at least one physical shared channel based on the time domain pattern and the frequency domain pattern,
wherein the series of demodulation reference signal configurations is based on a pre-configured traffic type, wherein the pre-configured traffic type comprises a unicast traffic type, and
wherein the series of demodulation reference signal configurations is further based on a closed-loop feedback between a first transmitter and a first receiver, wherein the closed-loop feedback is generated by the first receiver.

2. The system of claim 1, wherein the operations further comprise:
generating an indication of the series of demodulation reference signal configurations used by the first receiver to measure and generate a feedback to the first transmitter, wherein the indication comprises a first index value, wherein the first index value is one of a plurality of indications stored at a communication device.

3. The system of claim 2, wherein the feedback generated corresponding to elements of the indicated the series of demodulation reference signal configurations comprises a first value, wherein the first value is a parity check result based on the series of demodulation reference signal configurations.

4. The system of claim 1, wherein the operations further comprise:
generating an indication of the series of demodulation reference signal configurations used by first receiver to measure and generate a feedback to the first transmitter, wherein the indication comprises a density value and a comb offset.

5. The system of claim 1, wherein the operations further comprise:
receiving a confirmation via the closed-loop feedback that the series of demodulation reference signal configurations was adapted by a communication device.

6. The system of claim 1, wherein the series of demodulation reference signal configurations is based on a downlink control information signaling from a network node device having the first transmitter.

7. The system of claim 1, wherein the series of demodulation reference signal configurations is based on a radio resource controller signaling from a network node device having the first transmitter.

8. The system of claim 1, wherein the series of demodulation reference signal configurations based on a control element signaling from a network node device having the first transmitter.

9. A method, comprising:
generating, by a device comprising a processor, a series of demodulation reference signal configurations that define locations of a demodulation reference signal in frequency domain and time domain, wherein demodulation reference signals in the series of demodulation reference signal configurations have different numbers of symbols within the time domain;
selecting, by the device, a time domain pattern, a number of symbols within the time domain pattern, and a frequency domain pattern, based on the series of demodulation reference signal configurations; and
allocating, by the device, resources for the demodulation reference signal on at least one physical shared channel based on the time domain pattern and the frequency domain pattern,
wherein the series of demodulation reference signal configurations is based on a pre-configured traffic type, wherein the pre-configured traffic type comprises a unicast traffic type, and
wherein the series of demodulation reference signal configurations is further based on a closed-loop feedback between a first transmitter and a first receiver, wherein the closed-loop feedback is generated by the first receiver.

10. The method of claim 9, further comprising:
generating, by the device, an indication of the series of demodulation reference signal configurations used by the first receiver to measure and generate a feedback to the first transmitter, wherein the indication comprises a first index value, wherein the first index value is one of a plurality of indications stored at a communication device.

11. The method of claim 10, wherein the feedback generated corresponding to elements of the indicated the series of demodulation reference signal configurations comprises a first value, wherein the first value is a parity check result based on the series of demodulation reference signal configurations.

12. The method of claim 9, further comprising:
generating, by the device, an indication of the series of demodulation reference signal configurations used by the first receiver to measure and generate a feedback to the first transmitter, wherein the indication comprises a density value and a comb offset.

13. The method of claim 9, further comprising:
receiving, by the device, a confirmation via the closed-loop feedback that the series of demodulation reference signal configurations was adapted by a communication device.

14. The method of claim 9, wherein the series of demodulation reference signal configurations is based on a downlink control information signaling from a network node device having the first transmitter.

15. The method of claim 9, wherein the series of demodulation reference signal configurations is based on a radio resource controller signaling from a network node device having the first transmitter.

16. The method of claim 9, wherein the series of demodulation reference signal configurations based on a control element signaling from a network node device having the first transmitter.

17. A non-transitory machine-readable storage medium, comprising executable instructions that, when executed by a processor, facilitate performance of operations, comprising:

generating a series of demodulation reference signal configurations that define locations of a demodulation reference signal in frequency domain and time domain, wherein demodulation reference signals in the series of demodulation reference signal configurations have different numbers of symbols within the time domain;

selecting a time domain pattern, a number of symbols within the time domain pattern, and a frequency domain pattern based on the series of demodulation reference signal configurations;

allocating resources for the demodulation reference signal on at least one physical shared channel based on the time domain pattern and the frequency domain pattern; and generating an indication of the series of demodulation reference signal configurations used by first receiver to measure and generate a feedback to a first transmitter, wherein the indication comprises a first index value, wherein the first index value is one of a plurality of indications stored at a communication device, wherein the series of demodulation reference signal configurations is based on a pre-configured traffic type, wherein the pre-configured traffic type comprises a unicast traffic type, and wherein the series of demodulation reference signal configurations is further based on a closed-loop feedback between the first transmitter and the first receiver, where in the closed-loop feedback is generated by the first receiver.

18. The non-transitory machine-readable storage medium of claim 17, wherein the feedback generated corresponding to elements of the indicated the series of demodulation reference signal configurations comprises a first value, wherein the first value is a parity check result based on the series of demodulation reference signal configurations.

19. The non-transitory machine-readable storage medium of claim 17, wherein the operations further comprise:

generating an indication of the series of demodulation reference signal configurations used by the first receiver to measure and generate a feedback to the first transmitter, wherein the indication comprises a density value and a comb offset.

20. The non-transitory machine-readable storage medium of claim 17, wherein the series of demodulation reference signal configurations is based on a radio resource controller signaling from a network node device having the first transmitter.

* * * * *